US011881656B2

(12) United States Patent
Fabre et al.

(10) Patent No.: US 11,881,656 B2
(45) Date of Patent: Jan. 23, 2024

(54) SHIELDED CONNECTOR ASSEMBLY

(71) Applicant: APTIV TECHNOLOGIES LIMITED, St. Michael (BB)

(72) Inventors: Jean Fabre, Chartres (FR); Pascal Menard, Villepreux (FR); Jérémy X Leveque, Chartres (FR)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 150 days.

(21) Appl. No.: 17/684,010

(22) Filed: Mar. 1, 2022

(65) Prior Publication Data

US 2022/0285887 A1 Sep. 8, 2022

(30) Foreign Application Priority Data

Mar. 2, 2021 (FR) ....................................... 2102036

(51) Int. Cl.
*H01R 13/6582* (2011.01)
*H01R 13/436* (2006.01)
(Continued)

(52) U.S. Cl.
CPC ..... *H01R 13/6582* (2013.01); *H01R 13/4361* (2013.01); *H01R 13/506* (2013.01); *H01R 13/639* (2013.01)

(58) Field of Classification Search
CPC ............ H01R 13/6582; H01R 13/4361; H01R 13/506; H01R 13/639; H01R 2201/26; H01R 13/508; H01R 13/6581; H01R 13/502; H01R 24/00; H01R 43/18; H01R 43/20
See application file for complete search history.

(56) References Cited

U.S. PATENT DOCUMENTS 10,446,969 B2 10/2019 Bhat et al.
10,454,199 B1 10/2019 Christiano et al.
(Continued)

FOREIGN PATENT DOCUMENTS

EP 2579396 A1 4/2013
EP 3480900 A1 5/2019
(Continued)

OTHER PUBLICATIONS

TE Connectivity's new HC-STAK high-voltage interconnection system, Charged Electric Vehicles Magazine, https://chargedevs.com/sponsored/te-connectivitys-new-hc-stak-high-voltage-interconnection-system/.
(Continued)

*Primary Examiner* — Briggitte R. Hammond
(74) *Attorney, Agent, or Firm* — Carlson, Gaskey & Olds, P.C.

(57) ABSTRACT

Connection assembly comprising a connector and a counter-connector. The shielding cage of the connector has attachment means which are formed by deformation of the shielding cage, without an opening being created. The attachment means are configured to prevent the internal element of the connecting casing from moving in translation with respect to the shielding cage, parallel to the coupling direction (A). The shielding cage is prevented from moving in translation parallel to the coupling direction (A) with respect to the external casing element with the aid of the retaining device.

11 Claims, 5 Drawing Sheets

(51) Int. Cl.

| | |
|---|---|
| ***H01R 13/506*** | (2006.01) |
| ***H01R 13/639*** | (2006.01) |

(56) References Cited

U.S. PATENT DOCUMENTS

| | | | | |
|---|---|---|---|---|
| 2010/0151721 | A1 | 6/2010 | Tyler | |
| 2014/0110165 | A1* | 4/2014 | Ishikawa .................. | H01R 4/00 29/857 |
| 2017/0187150 | A1 | 6/2017 | Fabre et al. | |
| 2020/0244050 | A1 | 7/2020 | Corban et al. | |

FOREIGN PATENT DOCUMENTS

| | | | |
|---|---|---|---|
| EP | 3561967 | A1 | 10/2019 |
| WO | 2008109109 | A1 | 9/2008 |
| WO | 2013010680 | A1 | 1/2013 |
| WO | 2014060789 | A1 | 4/2014 |
| WO | 2014070851 | A1 | 5/2014 |
| WO | 2014108197 | A1 | 7/2014 |

OTHER PUBLICATIONS

Hybrid and Electric Mobility, TE Connectivity (TE), https://www.te.com/global-en/industries/hybrid-electric-mobility.html.

Search Report for French Application No. FR2102036 completed Nov. 11, 2021.

* cited by examiner

[Fig. 1]
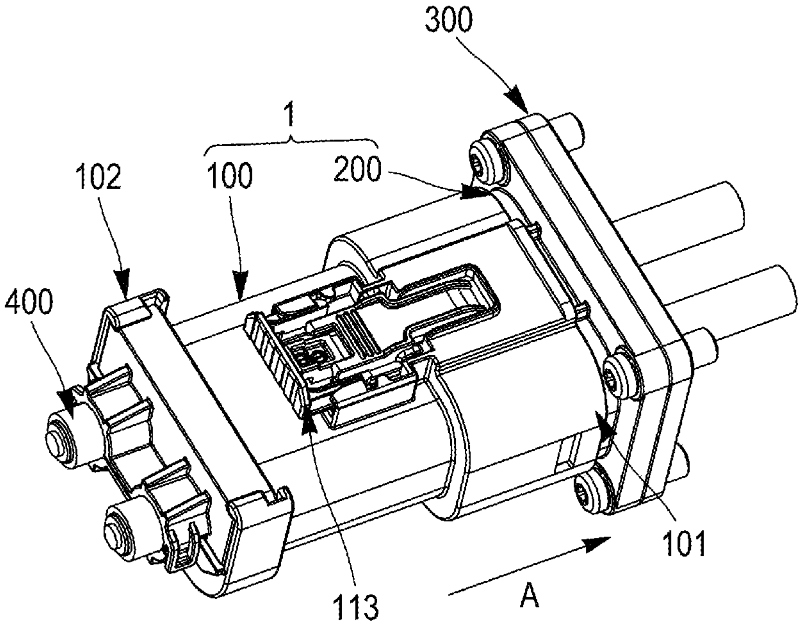
[Fig. 2]
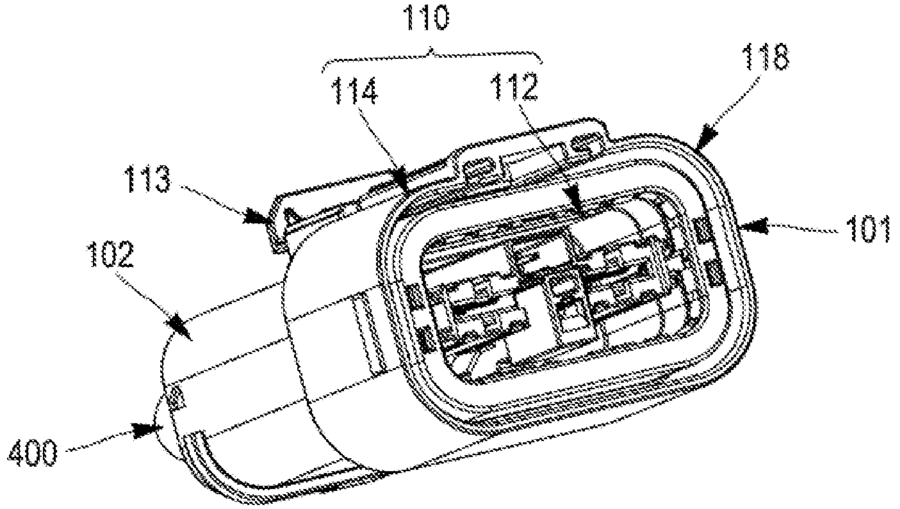

[Fig. 3]
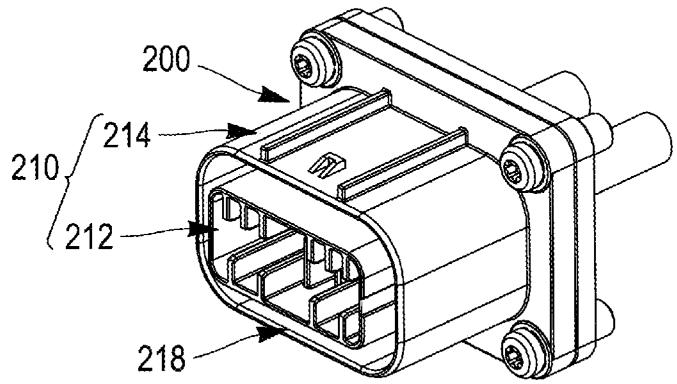
[Fig. 4]
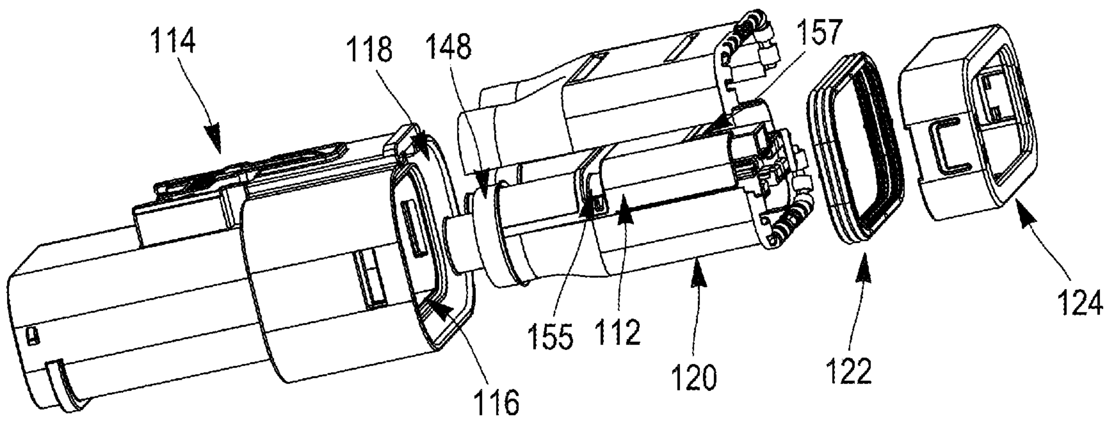
[Fig. 5]
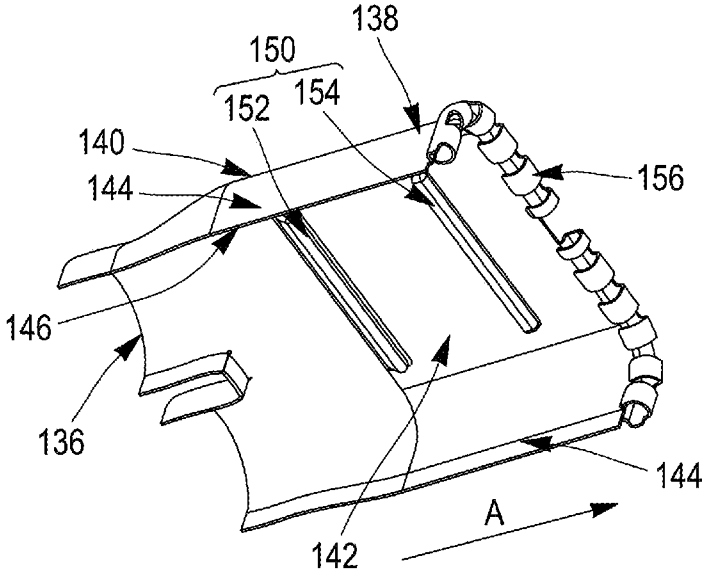

[Fig. 6]
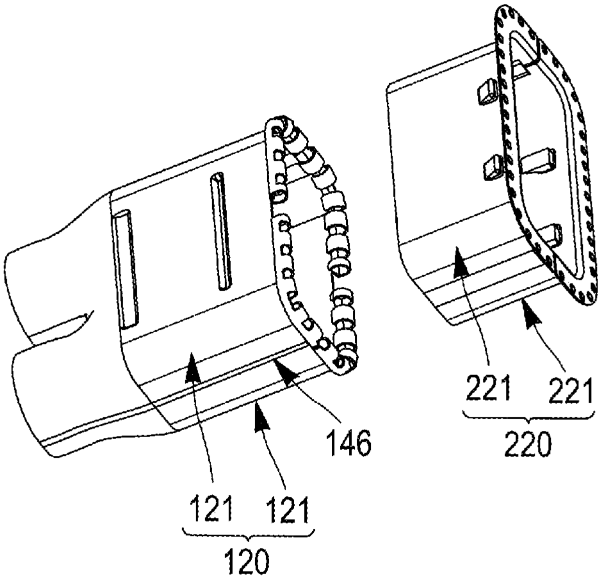
[Fig. 7]
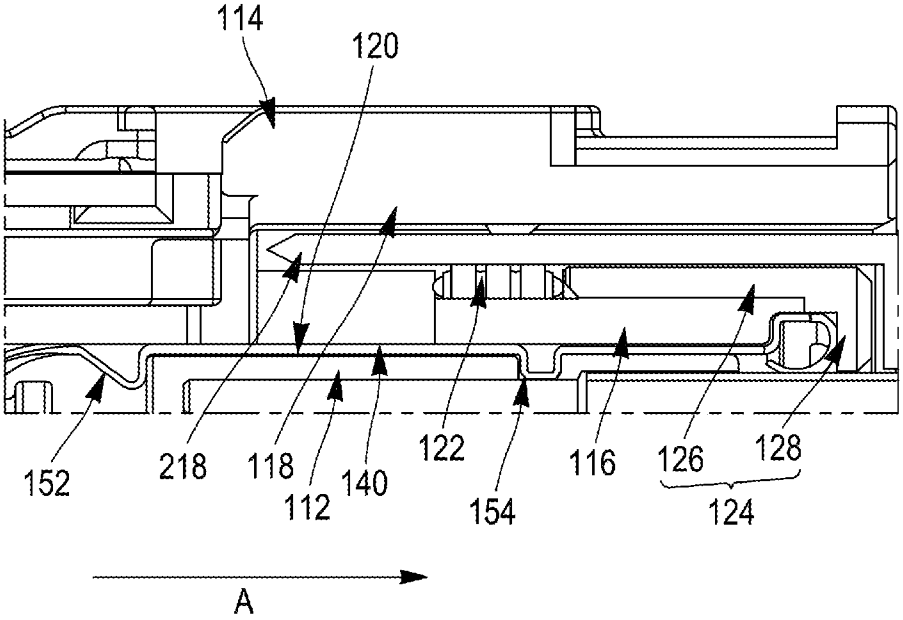

[Fig. 8]
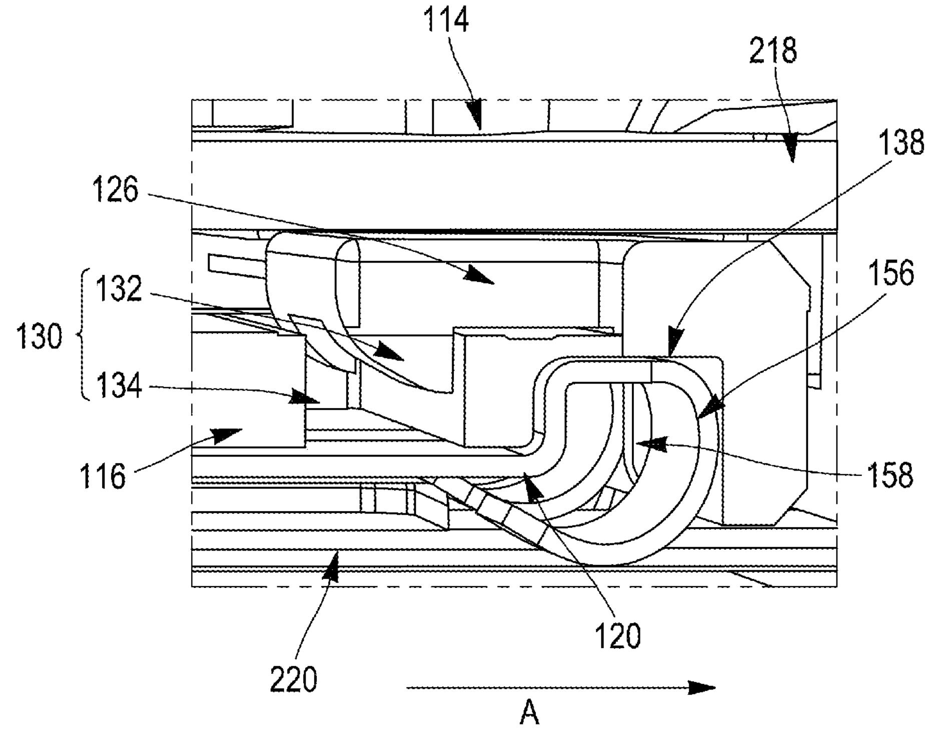
[Fig. 9]
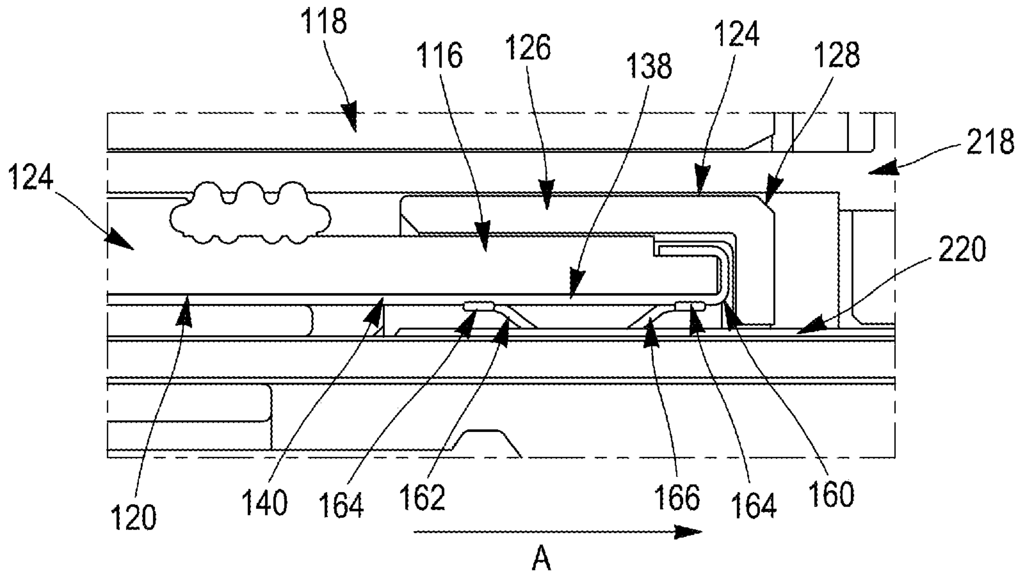

[Fig. 10]
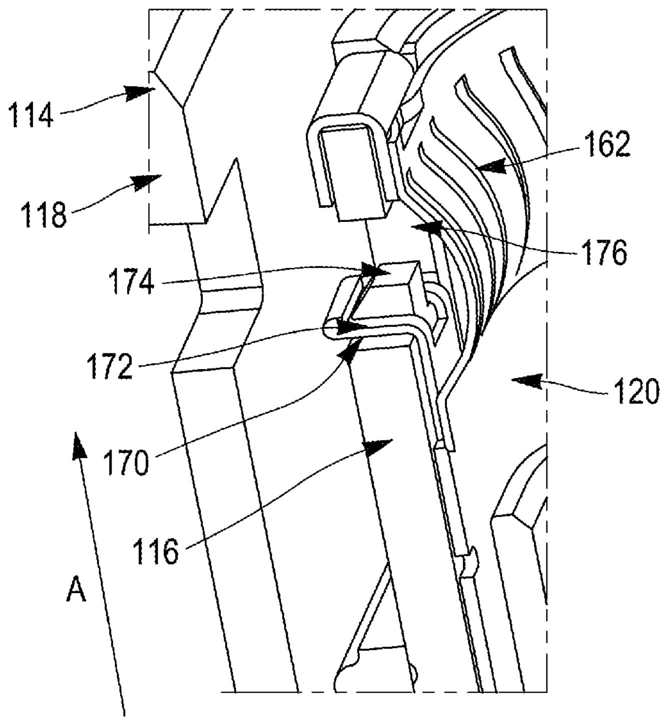
[Fig. 11]
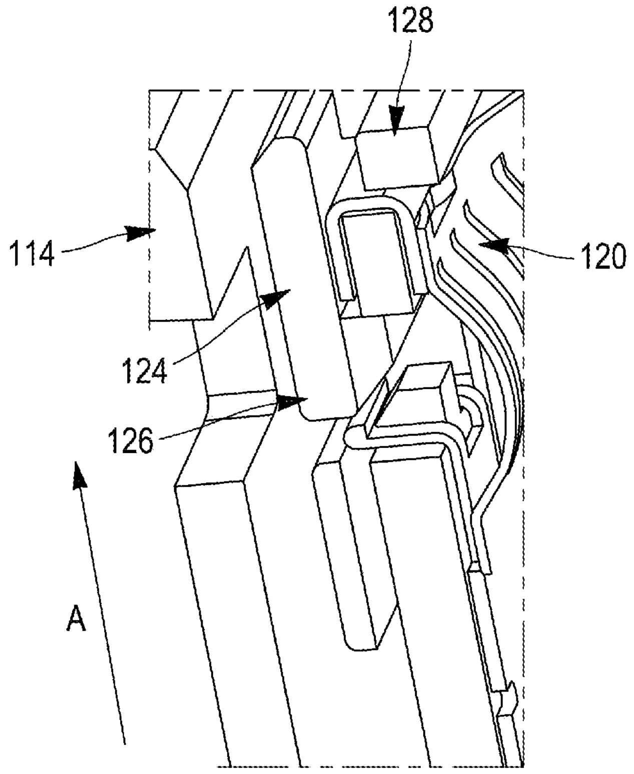

SHIELDED CONNECTOR ASSEMBLY

CROSS-REFERENCE TO RELATED APPLICATIONS

This application claims priority to French Patent Application No. FR2102036 filed on Mar. 2, 2021.

TECHNICAL FIELD

The invention relates to the field of electric power connectors for electric or hybrid motor vehicles.

BACKGROUND

Electric power connectors are used in electric or hybrid motor vehicles for example to interconnect a set of batteries to an electric motor, to a power converter, etc.

In hybrid and electric motor vehicles, the electric currents transmitted by the cables and the connectors of the electric power circuits are relatively high and can reach 600 amps, or even more then 1000 amps at current peaks. The electric power that passes through the electric cables and the connectors is therefore able to generate non-negligible electromagnetic interference. Thus, it is important to be able to limit this electromagnetic interference as much as possible. To this end, use is made of shielding on the cables, and on the connectors. This shielding comprises metal sheets forming shielding sleeves or cages surrounding an internal portion of a casing in which male or female contacts are accommodated. In a cable connector, these sheets establish electrical continuity between the shielding braids of the cables and some other metal element such as the shielding of a counter-connector, a metal wall, etc.

Thus, it may be necessary to ensure shielding continuity between a connector and a counter-connector coupled to this connector. The document WO2014108197A1 describes a connection assembly comprising a connector and a counter-connector, each respectively having a shielding cage, the shielding cages of the connector and of the counter-connector ensuring shielding continuity through this connection assembly.

However, openings are generally provided in the shielding of the connectors so as, for example, to fit the shielding sheets to the connector casing and/or to mount an external casing portion on an internal casing portion. Such openings reduce the screening performance of the shielding, however.

An aim of the present disclosure consists in helping to improve the performance of the connector shielding.

SUMMARY

To this end, a connection assembly is proposed, comprising a connector and a counter-connector. This connector and counter-connector are configured to be coupled together parallel to a coupling direction. This connector and counter-connector each respectively comprise a shielding cage, which are in electrical contact with one another when the connector is coupled to the counter-connector. This connector and the counter-connector also each respectively comprise a casing.

In this connection assembly, the connector casing has an internal casing element and an external casing element, which are formed of two separable elements, the external casing element having an internal wall. The connector also has a retaining device attached to the internal wall with the aid of fastening means.

In this connection assembly, the shielding cage of the connector has attachment means which are formed by deformation of the shielding cage of the connector, without an opening being created, and are configured to prevent the internal casing element from moving in translation with respect to the shielding cage of the connector parallel to the coupling direction. Moreover, the shielding cage of the connector is prevented from moving in translation parallel to the coupling direction with respect to the external casing element with the aid of the retaining device.

Thus, by immobilizing the internal casing element with the aid of the shielding cage and by immobilizing the shielding cage on the external casing element with the aid of the retaining device, it is no longer necessary to provide for attachment of the external casing element to the internal casing element through the shielding cage. By avoiding the creation of openings and/or cutouts in the shielding cage, the shielding properties thereof are improved.

This connection assembly also potentially has one and/or another of the following features, each considered independently of one another or in combination with one or several others:

- the shielding cage of the connector comprises two half-cages, each half-cage extending parallel to the coupling direction between a cable outlet portion and a contact portion, with a main portion situated between the cable outlet portion and the contact portion;
- the main portion has a channel shape with a bottom extending longitudinally, parallel to the coupling direction, between the cable outlet portion and the contact portion, and transversely between two lateral walls;
- the bottom does not have openings or cutouts;
- the shielding cage of the connector has a crown provided with elastic fingers compressed between the respective shielding cages of the connector and counter-connector;
- the shielding cage of the connector has at least one fastening tab bent radially towards the external wall of the external casing element, each fastening tab having a window configured to cooperate with a tooth that extends, parallel to the coupling direction, through an opening formed in the internal wall of the external casing element;
- the retaining device has a flange extending radially towards the inside of the external casing element, this flange cooperating with the cage in order to prevent a movement of the cage that tends to make it come out of the external casing element;
- the shielding cage of the connector has a front edge bent radially towards the outside to form a channel into which the front end of the internal wall of the external casing element is inserted, the retaining element being configured to immobilize this front edge against the front end of the internal wall of the external casing element;
- the contact portion has flexible tongues and the retaining device has walls that are interposed between at least some of the tongues and cooperate with a front end of the internal wall;
- the attachment means comprise at least one rib made by deformation of the shielding cage.

According to another aspect, a connector for a connection assembly as mentioned above is proposed.

According to yet another aspect, a method for assembling a connector for a connection assembly as mentioned above is proposed. This method comprises notably the operations of:

- inserting, into cells of the internal casing element, contacts to which ends of cables are crimped,
- disposing shielding half-cages around the internal casing element in order to form a shielding cage,
- inserting, through an opening in the external casing element that is configured to receive a counter-connector, the internal casing element on which the shielding cage is assembled, until these butt against the bottom of the external casing element,
- mounting the retaining device on the external casing element by interposing at least a portion of the shielding cage between the external casing element and the retaining device.

Potentially, this method comprises an operation of placing a seal around the internal wall of the external casing element such that, following the operation of mounting the retaining device on the external casing element, the seal is prevented from moving, parallel to the coupling direction, between the retaining device and the external casing element.

BRIEF DESCRIPTION OF THE DRAWINGS

Further features and advantages of the invention will become apparent from reading the following detailed description and from the appended drawings, in which:

FIG. 1 schematically shows a perspective view of one example of an embodiment of a connection assembly;

FIG. 2 schematically shows a perspective view of a connector for the connection assembly shown in FIG. 1;

FIG. 3 schematically shows a perspective view of a counter-connector for the connection assembly shown in FIG. 1;

FIG. 4 schematically shows a perspective and exploded view of certain components of the connector in FIG. 2;

FIG. 5 schematically shows a perspective view of a shielding half-cage of the connector in FIGS. 2 and 4;

FIG. 6 schematically shows a perspective view of the shielding cages of the connection assembly in FIG. 1;

FIG. 7 schematically shows a cross-sectional view of a part of the connector in FIG. 2;

FIG. 8 schematically shows a cross-sectional view of a detail of the connector in FIG. 2;

FIG. 9 schematically shows a cross-sectional view of a detail of a variant of the connector in FIG. 2;

FIG. 10 schematically shows a cross-sectional view of a detail of another variant of the connector in FIG. 2;

FIG. 11 schematically shows a cross-sectional view of a detail of the variant of the connector in FIG. 10, with a retaining device.

DETAILED DESCRIPTION

An example of a connection assembly 1 is shown in FIG. 1. This connection assembly 1 comprises a connector 100 coupled to a counter-connector 200, parallel to a coupling direction A (FIG. 1).

The connector 100 is a cable connector. The counter-connector 200 is a base configured to be mounted on a wall 300 through which it passes. According to this example, the connector 100 is a female connector and the counter-connector 200 is a male connector.

The connector 100 comprises a front end 101, corresponding to a coupling face, and a rear end 102 through which cables 400 exit (according to the example presented here, there are two of these cables 400, but the connector could comprise a single cable 400 or, by contrast, more than two cables 400) (FIG. 2). The connector 100 comprises a casing 110 formed of an internal casing element 112 and of an external casing element 114. The internal casing element 112 forms a contact-holder casing. A connector position assurance device (CPA) 113 may be mounted on the external casing element 114. The internal casing element 112 and the external casing element 114 are both moulded from an electrically insulating plastics material. The internal casing element 112 and the external casing element 114 are two separable elements that are assembled by one being fitted in the other.

The external casing element 114 comprises an internal wall 116 and an external wall 118 (FIG. 4), which surround and protect a coupling portion of the internal casing element 112. The internal wall 116 is connected to the external wall 118. The external wall 118 forms a skirt around the internal wall 116.

The connector 100 also comprises a shielding cage 120 interposed between the internal casing element 112 and the external casing element 114. The shielding cage 120 is formed of a metal sheet.

The connector 100 has a seal 122 and a retaining device 124. The seal 122 is mounted between the internal wall 116 and the external wall 118 of the external casing element 114, in sealing contact with the internal wall 116 (FIG. 7). A space is provided between the seal 122 and the external wall 118 in order to insert, into said space, an external wall 218 of the counter-connector 200, which comes into sealing contact with the seal 122. The retaining device 124 has a ring 126 mounted around the internal wall 116, leaving a space between the ring 126 and the external wall 118 such that the external wall 218 of the counter-connector 200 can be inserted into said space. The retaining device 124 also comprises a flange 128 extending radially towards the inside from a front end of the ring 126. The retaining device 124 may make it possible to prevent the seal 122 from moving in translation in the coupling direction A along the external casing element 114. The retaining device 124 is attached to the internal wall 116 with the aid of fastening means 130. For example, these fastening means 130 comprise teeth 132 protruding from the internal surface of the ring 126 (FIG. 8). These teeth 132 are configured to cooperate with notches 134 provided in the internal wall 116 of the external casing element 114 of the connector 100, in order to prevent the retaining device 124 from moving forward in translation (with reference to the front end 101 and rear end 102 of the connector 100), parallel to the coupling direction A.

The counter-connector 200 also has a casing 210 formed of an internal casing element 212 and of an external casing element 214 (FIG. 3). The internal casing element 212 corresponds to a contact-holder casing. The external casing element 214 corresponds to a support casing. The internal casing element 212 and the external casing element 214 are both moulded from an electrically insulating plastics material. The internal casing element 212 and the external casing element 214 are two separable elements that are assembled by one being fitted in the other. The external casing element 214 comprises an external wall 218. The external wall 218 forms a skirt around the coupling portion of the internal casing element 112.

The counter-connector 200 also comprises a shielding cage 220 interposed between the internal casing element 212 and the external casing element 214. The shielding cage 220 is formed of a metal sheet (FIG. 6).

When the connector 100 and counter-connector 200 are coupled, the external wall 218 of the counter-connector 200 is inserted in the groove provided between the internal wall 116 and the external wall 118 of the external housing element 114 of the connector 100, so as to be in sealing contact with the seal 122. When the connector 100 and counter-connector 200 are coupled, the shielding cage 220 of the counter-connector 200 is in electrical contact with the shielding cage 120 of the connector 100 (FIG. 8). More specifically, the shielding cage 220 of the counter-connector 200 is disposed radially towards the inside compared with the shielding cage 120 of the connector 100. The shielding cages of the connector 100 and counter-connector 200 are then disposed radially towards the inside compared with the internal wall 116 of the external casing element 114 of the connector 100.

According to one example of an embodiment, the shielding cages 120, 220 of the connector 100 and counter-connector 200 comprise two parts or half-cages 121, 221 (FIG. 6). These half-cages 121, 221 are formed by cutting and pressing.

A half-cage 121 of the connector 100 extends parallel to the coupling direction A between a cable outlet portion 136 and a contact portion 138 (FIG. 5). A main portion 140 is situated between the cable outlet portion 136 and the contact portion 138. The main portion 140 has a channel shape with a bottom 142 extending longitudinally, parallel to the coupling direction A, between the cable outlet portion 136 and the contact portion 138, and transversely between two lateral walls 144. The bottom does not have openings or cutouts in order to optimize the electromagnetic shielding properties.

In the example described in relation to FIGS. 5 and 6, the lateral walls 144 also do not have openings or cutouts in order to optimize the electromagnetic shielding properties. In this example, notably, the lateral walls 144 do not have structures for fastening the half-cages 121 together. The longitudinal edges 146 of the respective lateral walls 144 of the two half-cages 121 are brought together. These longitudinal edges 146 are kept together (optionally with an overlap), notably, on account of the fact that:

- the two-half-cages 121 are inserted and trapped between certain portions of the internal and external casing elements 112, 114, and that
- ferrules 148 keep the two half-cages 121 together at their cable outlet portions 136 (FIG. 4).

The cable outlet portion 136 has a shape that fits inside the external casing element 114 so as to retain the shielding cage 120 of the connector 100 in place therein if a force is exerted rearwardly on the shielding cage 120, for example, during the coupling of the connector 100 to the counter-connector 200, by the friction between the shielding cage 120 of the connector 100 and the shielding cage 220 of the counter-connector 200. The cable outlet portion 136 also has a shape which cooperates with the internal casing element 112 so as to retain the internal casing element 112 in place in the connector 100 if a force is exerted rearwardly thereon, for example during the coupling of the connector 100 to the counter-connector 200 and/or if traction is exerted on the cables 400.

Furthermore, the shielding cage 120 has attachment means 150 for attaching the shielding cage 120 to the internal casing element 112 without using openings in the sheet of the half-cages 121. For example, the shielding cage 120 of the connector 100 has at least one rib 152 or 154 forming a stop. Each rib 152, 154 is produced by deformation (pressing) without a cutout or opening therein. Each rib 152, 154 extends perpendicularly to the coupling direction A. Each rib 152, 154 protrudes from an internal surface of the shielding cage 120. For example, a first rib 152 is disposed at the limit between the cable outlet portion 136 and the main portion 140, and a second rib 154 is disposed in the main portion 140 (FIGS. 5 and 7). The first rib 152 and second rib 154 cooperate with a groove 155 and an indentation 157 provided in the internal casing element 112 (FIG. 4).

The contact portion 138 has elastic tongues 156 curved radially towards the inside of the shielding cage 120 (FIG. 8). Thus, these tongues 156 are configured to deform elastically and to apply pressure on the points of contact with the shielding cage 220 of the counter-connector 200. When the half-cages 121 are assembled to form the shielding cage 120 of the connector 100, the shielding cage 120 forms a sleeve, the wall of which is only perforated at the cutouts between the tongues 156. In other words, only the contact portion 138 is perforated. However, the latter is located next to a continuous (i.e. non-perforated) portion of the wall of the shielding cage 220 of the counter-connector 200.

Since the wall of the shielding cage 220 of the counter-connector 200 likewise does not have an opening, the connection assembly does not have an uncovered zone, without shielding. Even the junction between the respective shielding cages 120, 220 of the connector 100 and of the counter-connector 200 is covered by the sheets, and so there is in fact no shielding discontinuity in the connection assembly 1.

The assembly of the connector 100 comprises notably the operations of:

- inserting, into the cells of the internal casing element 112, the contacts to which the ends of the cables 400 are crimped,
- disposing the half-cages 121 around the internal casing element 112 in order to form the shielding cage 120 of the connector 100,
- inserting, through the opening in the coupling face of the external casing element 114, the internal casing element 112 on which the shielding cage 120 is assembled, until these butt against the bottom of the external casing element 114,
- placing the seal 122 around the internal wall 116 of the external casing element 114,
- mounting the retaining device 124 on the external casing element 114 by making the teeth 132 cooperate with the notches 134 provided in the internal wall 116 of the external casing element 114.

When the retaining device 124 is mounted in this way, the flange 128 bears on the front end of the internal wall 116 of the external casing element 114 via walls 158 that are inserted between the tongues 156 of the shielding cage 120. The tongues 156 are thus prevented, by the flange 128, from moving forward in translation, parallel to the coupling direction A.

All of the components of the connector 100 are thus held together: the internal casing element 112 is prevented from moving towards the rear and the front notably by the ribs 152, 154 of the shielding cage 120, which is itself prevented from moving towards the rear by the external casing element 114 and towards the front by the retaining device 124, which is mounted on the internal wall 116 and immobilized by the cooperation of the teeth 132 with the notches 134. The seal 122 is interposed between the external casing element 114 and the ring 126 of the retaining device 124.

When the connector 100 and the counter-connector 200 are coupled, the external wall 218 of the external casing element 214 of the counter-connector 200 is inserted between the internal wall 116 and external wall 118 of the external casing element 114 of the connector 100, the seal 122 proving sealing between the connector 100 and the counter-connector 200. The shielding cage 220 of the counter-connector 200 is inserted under the contact portion 138 of the shielding cage 120 of the connector 100, in order to ensure shielding continuity in the connection assembly 1.

According to another example of an embodiment (FIG. 9), the connection assembly 1 is essentially the same as the one described above and differs therefrom in the shape of the contact portion 138 of the shielding cage 120 of the connector 100. Specifically, the sheet of the main portion 140 extends continuously, without a cutout or opening, as far as a front edge 160 which is bent radially towards the outside so as to form a channel (U-shaped in cross section). The front end of the internal wall 116 of the external casing element 114 is inserted in this channel, thereby helping to prevent a movement of the shielding cage 120 with respect to the external casing element 114, towards the rear, parallel to the coupling direction A. The retaining device 124 is mounted on the external casing element 114 such that its flange 128 prevents a movement of the shielding cage 120 towards the front, parallel to the coupling direction A.

In order to bring about effective electrical contact between the contact portion 138 of the shielding cage 120 of the connector 100 and the shielding cage 220 of the counter-connector 200, the contact portion 138 is provided with a crown 162. This crown 162 has, for example, the shape of a metal strip welded to the contact portion 138 along two longitudinal edges 164 between which fingers 166 are curved radially towards the shielding cage 220 of the counter-connector 200. In the contact portion 138, there is therefore an overlap of two continuous portions (that is to say solid portions, without an opening) of the respective shielding cages 120, 220 of the connector 100 and counter-connector 200, with the crown 162 of elastic fingers 166 compressed therebetween.

According to yet another example of an embodiment (FIG. 10 and FIG. 11), the connection assembly is essentially the same as those described above and differs therefrom in that the contact portion 138 has fastening tabs 170 (a small number thereof, for example one on each of the lateral walls 144 of the half-cages 121). Each fastening tab 170 is bent radially towards the external wall 118 of the external casing element 114. Each fastening tab 170 has a window 172 configured to cooperate with a tooth 174 extending, parallel to the coupling direction A, towards the front through an opening 176 formed in the internal wall 116 of the external casing element 114. Once attached to a tooth 174, each fastening tab 170 helps to prevent a movement of the shielding cage 120 towards the rear, parallel to the coupling direction A. The retaining device 124 is mounted on the external casing element 114 such that its flange 128 prevents a movement of the shielding cage 120 towards the front, parallel to the coupling direction A. Moreover, the ring 126 interacts with the fastening tab 170 to likewise prevent this movement. Moreover, each fastening tab 170 is disposed behind the crown 162 of elastic fingers 166. In other words, since these elastic fingers 166 are configured to make contact with the shielding cage 220 of the counter-connector 200, on a portion of said shielding cage 220 that does not have openings or cutouts, each fastening tab 170 is disposed next to a solid and continuous zone of the shielding cage 220 of the counter-connector 200.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

The invention claimed is:

1. Connection assembly comprising:

a connector and a counter-connector, the connector and the counter-connector being configured to be coupled together parallel to a coupling direction (A), the connector and the counter-connector each respectively comprising a shielding cage, which are in electrical contact with one another when the connector is coupled to the counter-connector, the connector and the counter-connector each respectively comprising a casing, wherein the connector casing has an internal casing element and an external casing element, which are formed of two separable elements, the external casing element having an internal wall, the connector has a retaining device attached to the internal wall operatively with a fastening means, wherein the shielding cage of the connector has attachment means which are formed by deformation of the shielding cage of the connector, without an opening being created, and are configured to prevent the internal casing element from moving in translation with respect to the shielding cage of the connector parallel to the coupling direction (A), and wherein the shielding cage of the connector is prevented from moving in translation parallel to the coupling direction (A) with respect to the external casing element with the aid of the retaining device.

2. Connection assembly according to claim 1, wherein the shielding cage of the connector comprises two half-cages, each half-cage extending parallel to the coupling direction (A) between a cable outlet portion and a contact portion, with a main portion situated between the cable outlet portion and the contact portion, wherein the main portion has a channel shape with a bottom extending longitudinally, parallel to the coupling direction (A), between the cable outlet portion and the contact portion, and transversely between two lateral walls, and wherein the bottom does not have openings or cutouts.

3. Connection assembly according to claim 1, wherein the shielding cage of the connector has a crown provided with elastic fingers compressed between the respective shielding cages of the connector and counter-connector.

4. Connection assembly according to claim 1, wherein the shielding cage of the connector has at least one fastening tab bent radially towards the external wall of the external casing element, each fastening tab having a window configured to cooperate with a tooth that extends, parallel to the coupling direction (A), through an opening formed in the internal wall of the external casing element.

5. Connection assembly according to claim 1, wherein the retaining device has a flange extending radially towards an inside of the external casing element, the flange cooperating with the cage in order to prevent a movement of the cage that tends to make it come out of the external casing element.

6. Connection assembly according to claim 1, wherein the shielding cage of the connector has a front edge bent radially towards an outside to form a channel into which a front end of the internal wall of the external casing element is inserted, the retaining element being configured to immobilize this front edge against the front end of the internal wall of the external casing element.

7. Connection assembly according to claim 2, wherein the contact portion has flexible tongues and the retaining device has walls that are interposed between at least some of the tongues and cooperate with a front end of the internal wall.

8. Connection assembly according to claim 1, wherein the attachment means comprise at least one rib made by deformation of the shielding cage.

9. Connector configured to be coupled to a counter-connector parallel to a coupling direction (A), the connector comprising a casing, a shielding cage and a retaining device, the casing having an internal casing element and an external casing element, which are formed by two separable elements, the external casing element having an internal wall, and the retaining device being attached to the internal wall with the aid of fastening means, wherein the shielding cage has attachment means which are formed by deformation thereof, without an opening being created, the attachment means being configured to prevent the internal casing element from moving in translation with respect to the shielding cage parallel to the coupling direction (A), and in that the shielding cage is prevented from moving in translation parallel to the coupling direction (A) with respect to the external casing element with the aid of the retaining device.

10. Method for assembling a connector for a connection assembly according to claim 1, comprising the steps of:

inserting, into cells of the internal casing element, contacts to which ends of cables are crimped, disposing shielding half-cages around the internal casing element in order to form a shielding cage, inserting, through an opening in the external casing element that is configured to receive a counter-connector, the internal casing element on which the shielding cage is assembled, until these butt against a bottom of the external casing element, mounting the retaining device on the external casing element by interposing at least a portion of the shielding cage between the external casing element and the retaining device.

11. The method for assembling a connector according to claim 10, comprising a step of placing a seal around the internal wall of the external casing element such that, following the operation of mounting the retaining device on the external casing element, the seal is prevented from moving, parallel to the coupling direction, between the retaining device and the external casing element.

* * * * *